US009996357B2

(12) United States Patent
Albot et al.

(10) Patent No.: US 9,996,357 B2
(45) Date of Patent: *Jun. 12, 2018

(54) RESOLVING PAGE FAULTS OUT OF CONTEXT FOR SHARED CONTEXTS (71) Applicant: International Business Machines Corporation, Armonk, NY (US)

(72) Inventors: Andre L. Albot, Austin, TX (US); Vishal C. Aslot, Austin, TX (US); Arnold Flores, Round Rock, TX (US); Bruce Mealey, Austin, TX (US); Mark D. Rogers, Round Rock, TX (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 216 days.

This patent is subject to a terminal disclaimer.

(21) Appl. No.: 14/928,590

(22) Filed: Oct. 30, 2015

(65) Prior Publication Data

US 2017/0123690 A1    May 4, 2017

(51) Int. Cl.
 G06F 3/06    (2006.01)
 G06F 9/38    (2018.01)
 G06F 9/54    (2006.01)
(52) U.S. Cl.
 CPC .............. *G06F 9/38* (2013.01); *G06F 9/545* (2013.01)
(58) Field of Classification Search
 CPC .... G06F 3/0617; G06F 3/0652; G06F 3/0665; G06F 3/0673; G06F 9/545; G06F 9/38
 See application file for complete search history.

(56) References Cited

U.S. PATENT DOCUMENTS

| 6,085,296 | A | 7/2000 | Karkhanis et al. |
| 8,375,392 | B2 | 2/2013 | Becchi et al. |
| 9,053,022 | B2 | 6/2015 | Ronen et al. |
| 9,058,183 | B2 | 6/2015 | Woller et al. |
| 2004/0078631 | A1 | 4/2004 | Rogers et al. |
| 2009/0113110 | A1* | 4/2009 | Chen ..................... G06F 9/4426 711/6 |
| 2010/0094948 | A1 | 4/2010 | Ganesh et al. |
| 2010/0125709 | A1* | 5/2010 | Hall .................... G06F 12/1036 711/154 |
| 2011/0107007 | A1* | 5/2011 | van Riel ............. G06F 9/45558 711/6 |
| 2011/0161620 | A1 | 6/2011 | Kaminski et al. |

(Continued)

OTHER PUBLICATIONS

Gandhi, Jayneel, et al. "Efficient Memory Virtualization: Reducing Dimensionality of Nested Page Walks," Proceedings of the 47th Annual IEEE/ACM International Symposium on Microarchitecture. IEEE Computer Society, 2014, pp. 178-189.

*Primary Examiner* — Yaima Rigol
(74) *Attorney, Agent, or Firm* — Patterson + Sheridan, LLP (57) ABSTRACT Systems, methods, and computer program products to perform an operation comprising creating, by a kernel, a temporary effective address associated with a virtual segment identifier (VSID), wherein the VSID is received by a processor in an asynchronous interrupt generated by a coherent accelerator in response to a page fault generated by the coherent accelerator in executing an instruction, accessing the temporary effective address by the processor to recreate the page fault on the processor, and resolving the page fault by an operating system executing on the processor.

19 Claims, 9 Drawing Sheets (56) References Cited

U.S. PATENT DOCUMENTS

2013/0318323 A1 11/2013 Weissmann et al.
2014/0149677 A1 5/2014 Jayasena et al.
2014/0325163 A1 10/2014 Arndt
2014/0351554 A1 11/2014 Falik et al.

* cited by examiner

| ESID 405 | PAGE NUMBER (PNO) 410 | BYTE OFFSET 415 |
|---|---|---|

RESOLVING PAGE FAULTS OUT OF CONTEXT FOR SHARED CONTEXTS

BACKGROUND

Embodiments presented herein generally relate to FPGA-based coherent accelerators, and more specifically, to resolving page faults out of context for shared contexts on computing systems with FPGA-based coherent accelerators.

Some FPGA-based hardware accelerators provide an application direct access to the hardware accelerator. For example, an FPGA-based coherent accelerator allows an application to execute SCSI commands in an application's memory (i.e., user space) directly. In contrast to conventional hardware accelerators that need physical addresses to execute bus commands, coherent accelerators use effective addresses to issue bus commands to an attached storage device. As a result, an operating system does not need to perform actions that are typical (and computationally expensive) to a conventional hardware accelerator, such as translating effective addresses to physical addresses, which requires steps such as pinning memory pages to prevent page faults. A coherent accelerator translates effective addresses to real addresses while accelerating a function. Therefore, the operating system, via the coherent accelerator, allows page faults to occur, handling the page faults such that the accelerator may continue to access application memory. This approach greatly reduces the number of instructions required to set up a DMA path for data transfer. Further, coherent accelerators allow developers to customize applications to more efficiently use the FPGA.

To access the coherent accelerator, an application attaches application memory to a hardware context of the coherent accelerator. A hardware context may include a page table that maps application memory to pages of the page table. Further, a hardware context may include a segment table for processors that have a segmented architecture, which specify which virtual pages belong to a given segment. Some legacy applications do not directly support the coherent accelerator. Therefore, the coherent accelerator device driver may provide shared (or multiplexed) contexts that are shared by a number of different processes. More generally, for all types of applications and processes, due to the limited number of available contexts often results in contexts being shared by processes.

On conventional systems, page faults generate synchronous exceptions which arrive in the context of a process as a result of a memory access instruction (e.g., loads, stores, etc.). Therefore, the interrupts generated on such systems responsive to page faults are synchronous interrupts. However, coherent accelerators may generate asynchronous interrupts, as a processor may receive an interrupt from a process that is not currently executing on that processor.

SUMMARY

Embodiments disclosed herein include systems, methods, and computer program products to perform an operation comprising creating, by a kernel, a temporary effective address associated with a virtual segment identifier (VSID), wherein the VSID is received by a processor in an asynchronous interrupt generated by a coherent accelerator in response to a page fault generated by the coherent accelerator in executing an instruction, accessing the temporary effective address by the processor to recreate the page fault on the processor, and resolving the page fault by an operating system executing on the processor.

DETAILED DESCRIPTION

Embodiments disclosed herein provide techniques to resolve page faults generated by processes sharing a hardware context in a system which includes a coherent accelerator. A page fault occurs when a running program accesses a memory page that is mapped into the virtual address space, but the data is not present in main memory. Some systems may provide a coherent accelerator processor interface (CAPI) which allows a coherent accelerator to directly access the memory of a requesting process using the requesting process' effective address space. The coherent accelerator may use a segment table allocated to the requesting process to map the effective address to a global virtual segment identifier (VSID) and a page number (VPN). The coherent accelerator may then search a hardware page table (HPT), which is global to all processes in the system, for a page translation entry (PTE) that matches the VSID and VPN. If found, the PTE includes the physical address needed for CAPI to access the memory. If no such PTE is in the HPT, a page fault occurs, and the CAPI may send an interrupt to the operating system (OS) to create the PTE.

An FPGA-based coherent accelerator includes a number of hardware contexts in user space and kernel space. These contexts provide processes (executing in a computing system) with direct access to the coherent accelerator via effective addresses (as opposed to real addresses in physical memory). As a result, the coherent accelerator significantly reduces the amount of instructions needed for I/O operations and system calls for direct memory access (DMA), particularly when compared to a conventional PCI accelerator.

In one embodiment, a hardware context includes a page table and a number of segment tables. The page table and segment tables allow the coherent accelerator to identify a location in virtual address space in which memory of a mapped process is located. The page table is a global table that maps memory pages to a given process. Further, segment tables specify which memory pages belong to which segment of a given process. Each process may include a distinct segment table in the context. In contrast to conventional PCI accelerators, applications can execute instructions that directly interface with a coherent accelerator.

Typically, the amount of hardware contexts used by the coherent accelerator is limited. For example, a coherent accelerator may include a few hundred contexts available to processes executing in the computing system. However, the coherent accelerator allows processes to share contexts if the amount of processes exceeds the total amount of contexts, which in turn allows a greater amount of processes to access the coherent accelerator.

In one embodiment, the coherent accelerator includes a device driver that reserves one or more contexts ("kernel contexts") that applications may share. Each kernel context provides a global virtual address space. The global virtual address space is not associated with any specific user process. Further, the global virtual address space is associated with a global segment table that maps effective addresses to the global virtual address space. The coherent accelerator may receive requests from applications to use the accelerator (e.g., requests to perform I/O operations). Each request may specify an effective address to a location in a private segment table (i.e., a local segment table associated with the process).

However, the global effective address space is not distinct among processes. For example, a process A and a process B can both include an effective address of ABCD, each effective address referencing data corresponding to a private segment table location for the respective process. Mapping the effective addresses as is to a global segment table would result in duplicate segment table entries. The presence of duplicate entries prevents the coherent accelerator from directly using the effective addresses. To solve this issue, the coherent accelerator remaps the effective address specified in the request to an effective address in the global segment table. For example, assume that two applications send a read I/O request, where the first application sends the request to an address ABCD of its corresponding segment table, and the second application sends the request to an address ABCD of its corresponding segment table. The coherent accelerator may receive both requests and remap the addresses to distinct locations in the global segment table of the kernel. For example, the coherent accelerator may remap the address specified by the first application to address 0123 of the global segment table and the address specified by the second application to address 5678 of the global segment table. Doing so maps each address in the respective private segment tables to an address in the global segment table and allows the coherent accelerator to access memory of each application without conflict. Effectively, the first and second applications share the kernel context with one another.

Advantageously, the global segment table allows user space processes to share kernel contexts, which allows the coherent accelerator to achieve scalability in the number of processes that exploit the coherent accelerator. A user space process may continue to use its own effective address space to access its memory on the central processing units (CPUs). That is, because the coherent accelerator maps the effective addresses to the global segment table, the user space process may remain unaware of the global address space provided in the kernel. The coherent accelerator may track, via the global segment table, memory addresses belonging to a given process. Once the I/O completes (i.e., an acceleration for a request is complete), the device driver for the coherent accelerator deletes the remapped address from the global segment table.

When a process executing on the coherent accelerator experiences a page fault, the coherent accelerator is unable to resolve the page fault. Instead, the coherent accelerator may generate an interrupt responsive to the page fault, and transmit the interrupt to a processor (CPU) of the system. Often, the system includes many processors, none of which may be executing the process that generated the interrupt on the coherent accelerator. As such, the processor receiving the interrupt cannot identify the process which generated the interrupt, and is therefore unable to resolve the page fault using the page fault handler of the OS running on the system.

Further complicating matters is when a page fault interrupt is generated by a process that uses a shared kernel context. The shared kernel context is allocated a single interrupt source number, which in turn is associated with each process sharing the shared context. As such, the processor cannot use the interrupt source number included in the interrupt to identify the process (of the plurality of processes sharing the context) that generated the page fault.

However, the state information of the interrupt includes a virtual segment identifier (VSID). Embodiments disclosed herein leverage the VSID to resolve a page fault generated by a process that uses a shared kernel context. Specifically, embodiments disclosed herein temporarily attach the VSID into the address space of the process currently executing on the processor when the processor receives the interrupt. Doing so makes the faulting address addressable by the process executing on the processor. Embodiments disclosed herein may then recreate the page fault by touching (attempting to access) the faulting address.

When the page fault is recreated on the CPU, the OS page fault handler may be invoked to resolve the page fault. The OS page fault handler may then attempt to create the appropriate page translation entry to resolve the page fault (or bring the page into memory 120). If the page fault is resolved successfully, the process may be restarted on the coherent accelerator. In one embodiment, the coherent accelerator is restarted by performing a memory mapped I/O (MMIO) to the coherent accelerator to resume the shared context. In another embodiment, where the coherent accelerator repeatedly polls on the command queue, a new command such as "resume" may be queued causing the coherent accelerator to resume the previous command (the one that faulted). In yet another embodiment, a bit in the faulting command block may be set indicating to the coherent accelerator that the command should be resumed or aborted. If the page fault is not successfully resolved, the process may notify the coherent accelerator (again using an architected or unarchitected method) to abort the command which generated the page fault, or to reset (and/or detach) the current hardware context executing on the coherent accelerator.

Note, the following describes a coherent accelerator processor interface (CAPI) as a reference example of a FPGA-based coherent accelerator that remaps effective addresses of user space processes (e.g., applications, libraries, etc.) to a global address space in a kernel context. However, one of skill in the art will recognize that the embodiments disclosed herein may be adapted to a variety of coherent accelerators configured to provide that allows sharing of hardware contexts between user space applications and libraries.

Figure 1:
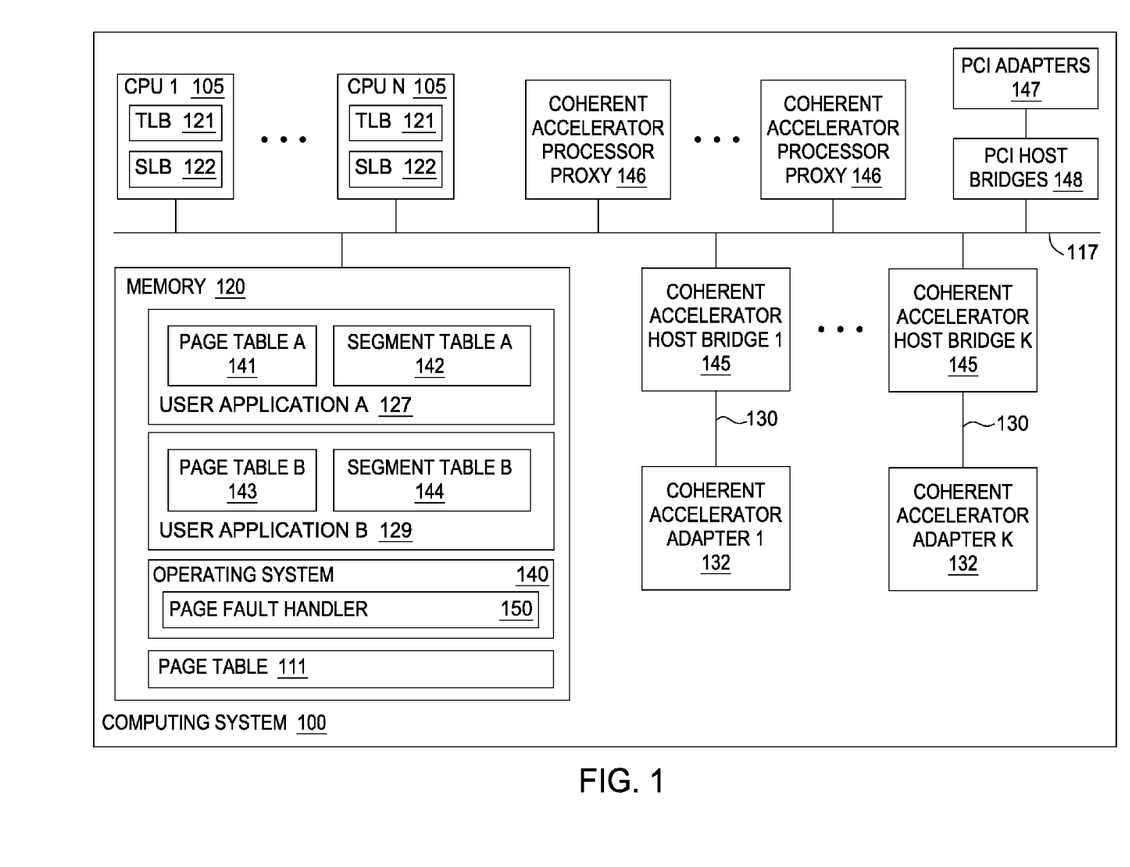
FIG. 1 illustrates an example computing system configured with a coherent accelerator, according to one embodiment.

FIG. 1 illustrates an example computing system 100 configured with an FPGA-based coherent accelerator, according to one embodiment. As shown, computing system 100 includes one or more central processing units (CPUs) 1-N 105, one or more coherent accelerator processor proxies (CAPPs) 146, one or more peripheral component interconnect (PCI) adapters 147, one or more PCI host bridges 148, a memory 120, one or more coherent accelerator host bridges 1-K 145, and one or more coherent accelerator adapters 1-K 132. The CPUs 105, CAPPs 146, PCI host bridges 148, memory 120, and coherent accelerator host bridges 145 may each be connected via an interconnect bus 117. Further, the coherent accelerator adapters 132 may each connect with a respective coherent accelerator host bridge 145. The computing system may also include an I/O device interface connecting I/O devices (e.g., keyboard, display, and mouse devices) to the computing system 100. Storage devices may be connected via one of the coherent accelerator adapters 132 or PCI adapters 147. The CPUs 105 each include a translation lookaside buffer (TLB) 121 and a segment lookaside buffer (SLB) 122. The hardware page table 111 stores system-wide mappings between virtual addresses and physical addresses. In one embodiment, the virtual addresses in the hardware page table 111 are based on a hash of a virtual segment identifier (VSID) and virtual page number (PNO).

Each CPU 105 retrieves and executes programming instructions stored in the memory 120 as well as stores and retrieves application data residing in the storage devices. The bus 117 is used to transmit programming instructions and application data between the CPUs 105, CAPPs 146, PCI host bridges 148, coherent accelerator host bridges 145, and memory 120. In one embodiment, CPU 105 is representative of the "POWER" microprocessor by IBM.

In one embodiment, the coherent accelerator adapter 132 is a FPGA-based hardware accelerator that may directly access an effective address space of an application (e.g., the user application A 127, user application B 129, etc.). Each application has its own effective address space. For example, a 32-bit process may have an effective address space from $2^0$ to $2^{32}$. Further, each address space comprises a number of fixed-size virtual memory segments. A segment is logical container of pages, and in this embodiment, is fixed-sized at 256 MB. A page is a fixed-size piece of memory. The 32-bit effective address space described in this example may contain up to sixteen segments. As another example, a 64-bit effective address space may contain up to $2^{36}$ segments. Further still, each effective address in a process effective address space includes an effective segment identifier (ESID), which specifies a segment for that effective address.

In some systems, effective addresses in a user application address space do not map directly to real memory. In one embodiment, an operating system 140 of computing system 100 maintains a global virtual address space that maps to real memory. Further, the global virtual address space comprises a number of segments, where each virtual address includes a virtual segment identifier (VSID) that specifies a segment for that virtual address. In addition, each effective address maps into a location in the global virtual address space.

The coherent accelerator adapter 132 provides a general purpose framework for transferring data to and from application memory, without requiring a direct memory access (DMA) setup. As a result, the coherent accelerator adapter 132 significantly reduces the I/O path length (e.g., from tens of thousands of instructions to a few hundred instructions). Further, the coherent accelerator adapter 132 allows developers to customize on the FPGA without having to create additional software to do so. For instance, user application A 127 is an example of a process that is configured to issue commands to the coherent accelerator adapter 132. Other applications that are not configured to issue commands to the coherent accelerator adapter 132 (e.g., user application B) may still execute within the framework provided by the coherent accelerator adapter 132. As further described below, the coherent accelerator adapter 132 provides data transfer between storage devices and applications via a virtual address space. In one embodiment, the coherent accelerator adapter 132 includes a processor service layer (not shown) that translates virtual addresses to real addresses to provide coherence. Further, processor service layer generates page faults and Accelerator Function Unit (AFU)-specific interrupts.

In one embodiment, the user application A 127 includes a page table A 141 and a segment table A 142. In addition, the user application B 129 includes a page table B 143 and a segment table B 144. The page tables 141 and 143 are per-process (or per-application) page tables, and map virtual pages to corresponding physical addresses in memory 120. In at least one embodiment, the page tables 141 and 143 are subsets of the global hardware page table 111. The segment tables 142 and 144 stores mappings of effective addresses to virtual addresses for their respective applications. In one embodiment, the TLB 121 and the SLB 122 of the CPU 105 are lookaside buffers used by the coherent accelerator adapter 132 to maintain recent translations of memory addresses. For instance, the SLB 122 may maintain recent translations of effective addresses to virtual addresses. In addition, the TLB 121 may maintain recent translations of virtual addresses to real addresses. In one embodiment, the hardware page table 111, per-process page tables 141 and 143, per-process segment tables 142 and 144, TLB 121, and SLB 122 may be included in a memory management unit (MMU). In one embodiment, the CAPPs 146 enforce coherence in the processor service layers of each coherent accelerator adapter 132. To do so, the CAPPs 146 may monitor coherency traffic (e.g., relating to cache coherence, page table coherence, segment table coherence, etc) on the bus 117.

Further, the coherent accelerator adapter 132 may provide a number of contexts in user space and kernel space in that include a shared page table and segment table. Each context may be shared by multiple processes (e.g., user applications A and B) executing in the memory 120. A shared kernel context provides a kernel device driver that interfaces between a given process and the coherent accelerator adapter 132.

As shown, the system 100 is under control of an operating system 140. Examples of operating systems include versions of the UNIX operating system (such as the AIX operating system), versions of the Microsoft Windows operating system, and distributions of the Linux operating system. (UNIX is a registered trademark of The Open Group in the United States and other countries. Microsoft and Windows are trademarks of Microsoft Corporation in the United States, other countries, or both. Linux is a registered trademark of Linus Torvalds in the United States, other countries, or both.) More generally, any operating system supporting the functions disclosed herein may be used. As shown, the operating system 140 includes a page fault handler 150 which attempts to resolve page faults experienced by processes executed on the CPU 105. When the CPU 105 tries to access a location from a page that is not present in memory, the MMU may interrupt the CPU 105, which halts the process on the CPU 105. The MMU may then invoke the page fault handler 150, which receives the state information of the faulting process. The page fault handler 150 may then perform any number of operations to handle the page fault. For example, the page fault handler 150 may find where the desired page resides (e.g., on a storage device), and read the page into memory 120, or create an appropriate entry (e.g., in the page table or TLB). If the page fault handler 150 is unable to resolve the page fault and make the requested page available in memory, the offending process must be aborted.

Figure 2:
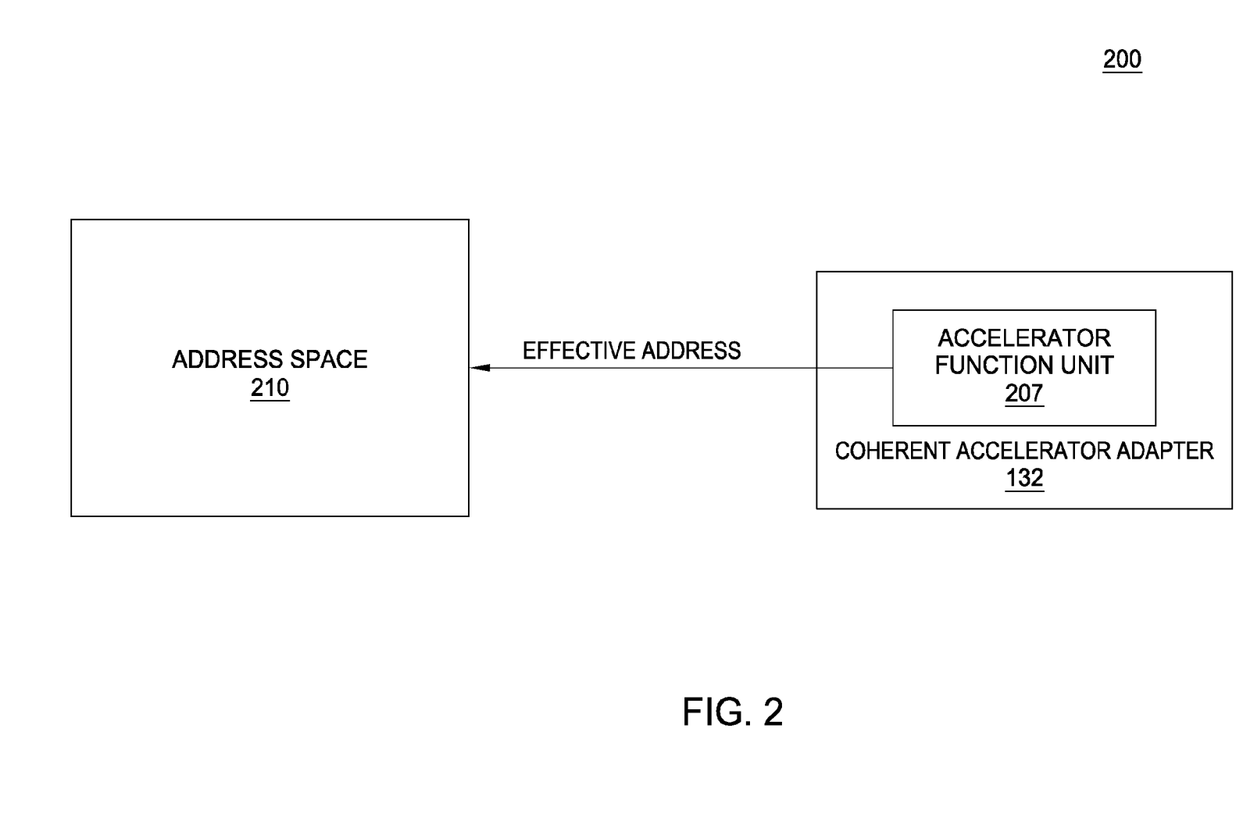
FIG. 2 illustrates an abstraction of data transfer between a process and a coherent accelerator-enabled device, according to one embodiment.

FIG. 2 illustrates an abstraction of data transfer between a coherent accelerator-enabled device (e.g., a storage device) and a process, according to one embodiment. Illustratively, a coherent accelerator adapter 132 allows transfer of data between a storage device and an effective address space 210 of a given application via an accelerator function unit (AFU) 207. The application and the AFU 207 may transfer data to one another using effective addresses.

Each effective address maps to a real address in physical memory. However, because each application using the shared kernel context maintains its own distinct effective address space, rather than directly translate a given effective address to a real address, a kernel device driver executing in the operating system may remap the application-specific effective address to a location in an effective address space global to the other applications using the shared kernel context. The global address space is a virtual mapping of process-specific effective addresses to a shared space. As further described below, the coherent accelerator adapter 132 may then use the remapped effective address to determine a mapping to a real address via a global segment table of the kernel. The global segment table maps effective segment identifiers to a segment identifier of a virtual address.

Figure 3:
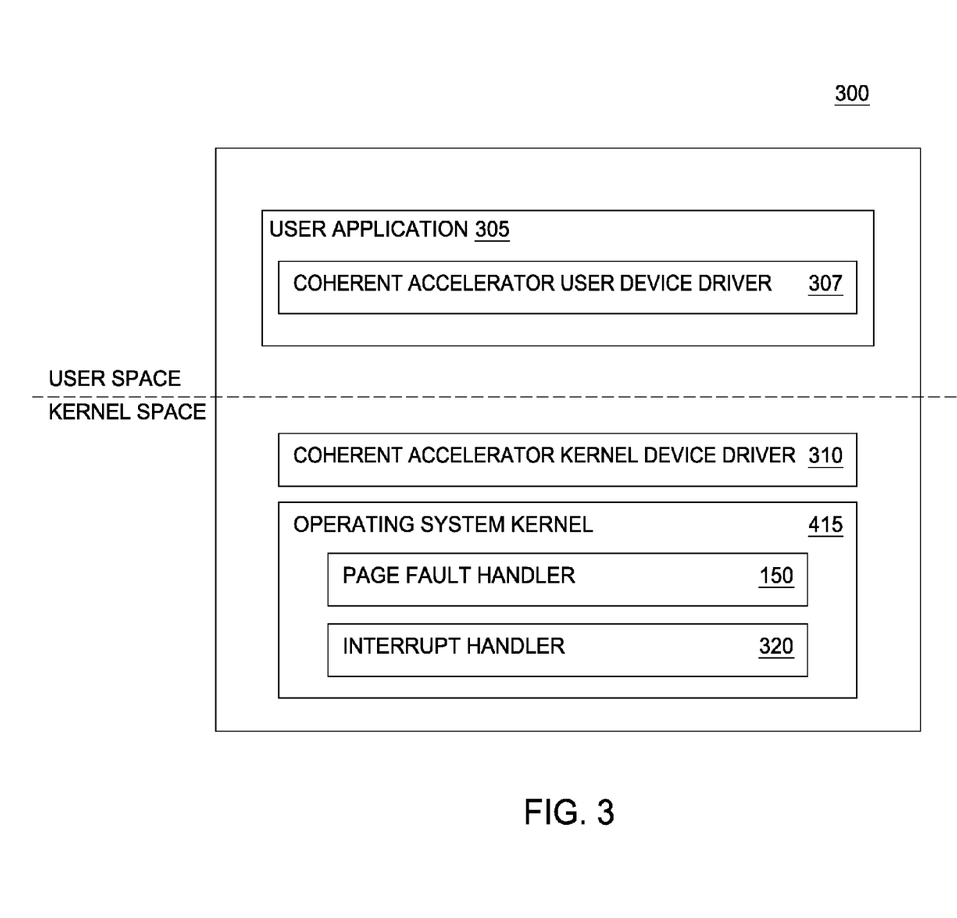
FIG. 3 illustrates an abstraction of a user application configured to communicate with a coherent accelerator, according to one embodiment.

FIG. 3 illustrates a user application 305 configured to communicate with a coherent accelerator, according to one embodiment. Illustratively, FIG. 3 depicts the user application 305 in user space of the operating system of the computer system 100. Further, FIG. 3 depicts a coherent accelerator kernel device driver 310 and an operating system kernel 315 in kernel space of the operating system. The operating system kernel 315 manages memory, tasks, processes, and disks in the operating system. As shown, the operating system kernel 315 includes the page fault handler 150 and an interrupt handler 320. The interrupt handler 320 is generally configured to process interrupts received from the hardware of the system 100, such as the coherent accelerator 132. Examples of interrupts include interrupts generated when a page fault is incurred.

In one embodiment, the user application 305 includes a coherent accelerator user device driver 307. The device driver 307 is a full user-mode driver that enables the user application 305 to communicate with the coherent accelerator adapter 132. Further, the device driver 307 sends I/O operations and commands to the kernel device driver 310. The user application 305 may use its own context to communicate with the coherent accelerator adapter 132 directly without going through the kernel context.

In one embodiment, the coherent accelerator kernel device driver 310 controls the accelerator function unit of the coherent accelerator adapter 132. For example, the kernel device driver 310 may attach and detach contexts to the coherent accelerator adapter 132 on behalf of application memory. Further, the kernel device driver 310 may perform memory-mapped I/O (MMIO) to the coherent accelerator adapter 132. In addition, the kernel device driver 310 may register a kernel context in a storage device. Doing so allows a given process to use DMA services, e.g., to map/unmap requests in the global segment table in the kernel context.

Note, FIG. 3 depicts a user application 305 that is configured with a user space driver (i.e., coherent accelerator user device driver 307) which allows the user application 305 to directly communicate with a coherent accelerator adapter 132. However, even a user application that is unaware of the coherent accelerator adapter 132 may share a kernel context with another such user application.

Figure 4:
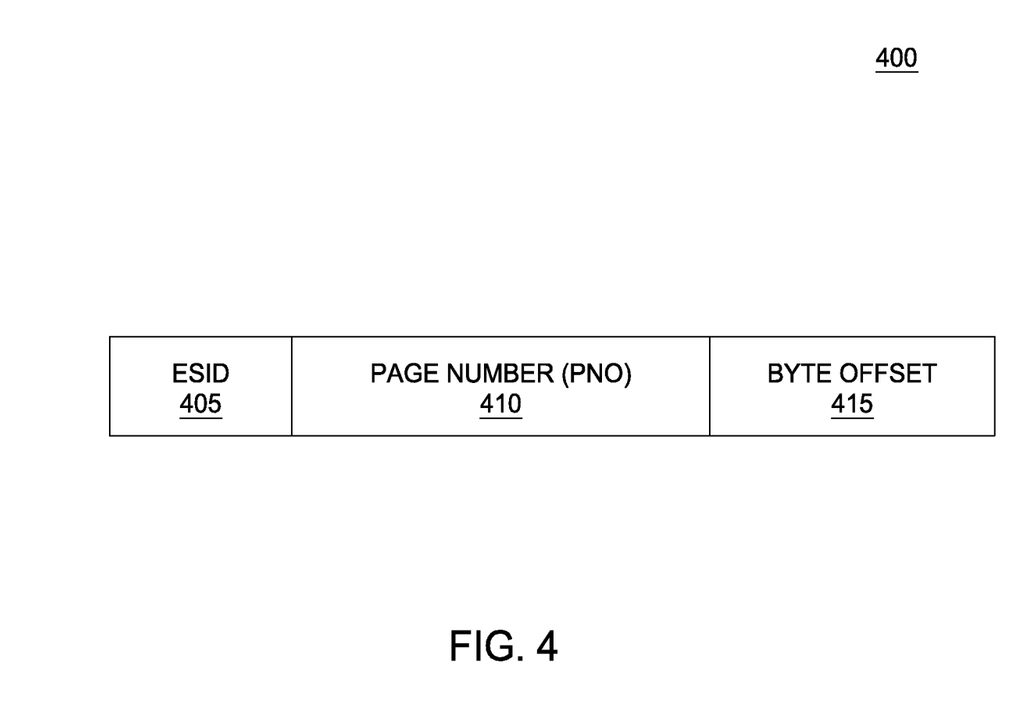
FIG. 4 illustrates an example layout of an effective address, according to one embodiment.

FIG. 4 illustrates an example layout of an effective address 400, according to one embodiment. As shown, the effective address 400 includes an effective segment identifier (ESID) 405, a page number (PNO) 410, and a byte offset 415. The ESID 405 specifies a segment in a process' effective address space that the effective address 400 belongs to. A given segment may include a range of addresses. For example, in a 32-bit effective address space, an ESID 405 of 0x0 may include a range of addresses 0x0000_0000 to 0x0FFF_FFFF, an ESID 405 of 0x1 may include a range of addresses 0x0000_0000 to 0x1FFF_FFFF, and so on.

Further, the PNO 410 specifies an index of a page within that segment. The byte offset 415 specifies an offset of a byte within that page. In practice, for a 32-bit effective address, an ESID 405 of 4 bits, a PNO 410 of 16 bits, and a byte offset 415 of 12 bits have shown to be effective. For a 64-bit effective address, an ESID 405 of 46 bits, a page number of 16 bits, and a byte offset of 12 bits has shown to be effective.

Figure 5:
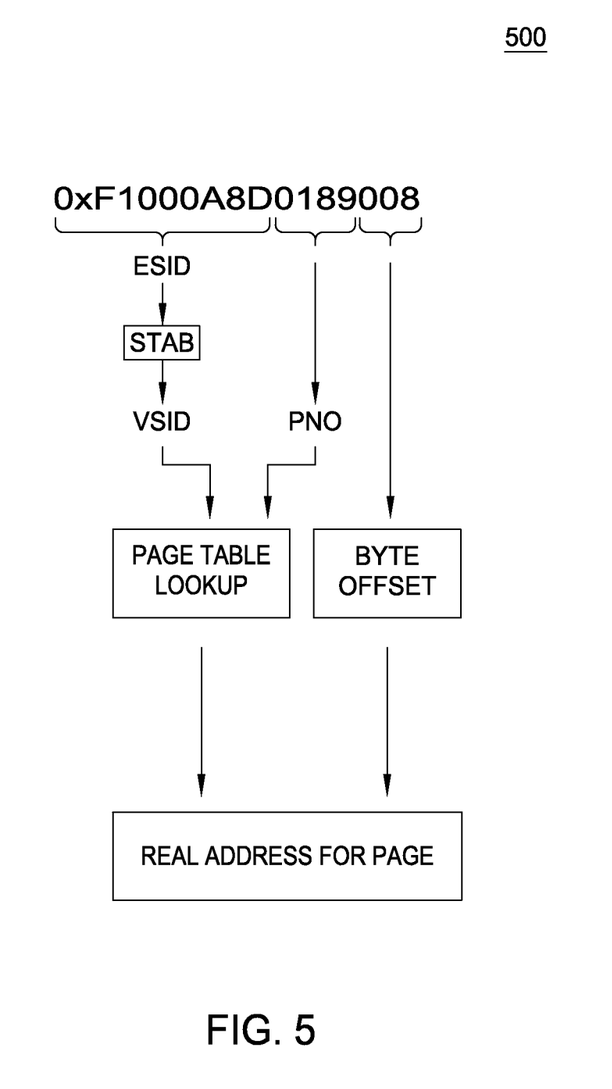
FIG. 5 illustrates an example flow of translating an effective address to a real address, according to one embodiment.

FIG. 5 illustrates an example flow of translating an effective address to a real address in a shared kernel context, according to one embodiment. The kernel device driver 310 may receive a request, e.g., from a process configured to issue bus commands, to perform I/O on a given storage device attached to the kernel device driver 310. The request may specify an effective address, as depicted by the effective address 501 of 0xF1000A8D0189008. Illustratively, the portion 'F1000A8D' represents the ESID of the effective address 501. The portion '0189' represents the PNO of the effective address 501. And the '008' portion represents the page offset of the effective address 501.

In one embodiment, the kernel device driver 310 translates the ESID of the effective address to a corresponding VSID. To do so, the kernel device driver 310 determines a mapping of the effective address of the process to an effective address in the shared kernel context. Doing so allows the kernel device driver 310 to determine the corresponding VSID from the global segment table using the effective address of the shared kernel context. As stated, the global segment table of the kernel may include mappings between ESIDs and VSIDs. The coherent accelerator 132 determines a corresponding VSID based on the mappings in the global segment table. Once the VSID is identified, the kernel device driver 310 then performs a lookup in the page table 111 using the VSID and PNO combination. The kernel device driver 310 then applies the byte offset in the page resulting from the lookup. As a result, the kernel device driver 310 can obtain a real address.

In one embodiment, in addition to remapping the effective address to a global virtual address, the kernel device driver 310 may build a proper command based on the I/O request and queue the command to a command and response queue. Similar to a conventional I/O stack, the application may block other I/O until the queued command completes. The kernel device driver 310 may determine whether to release the I/O before recovering the coherent accelerator and then restarting the I/O.

Figure 6:
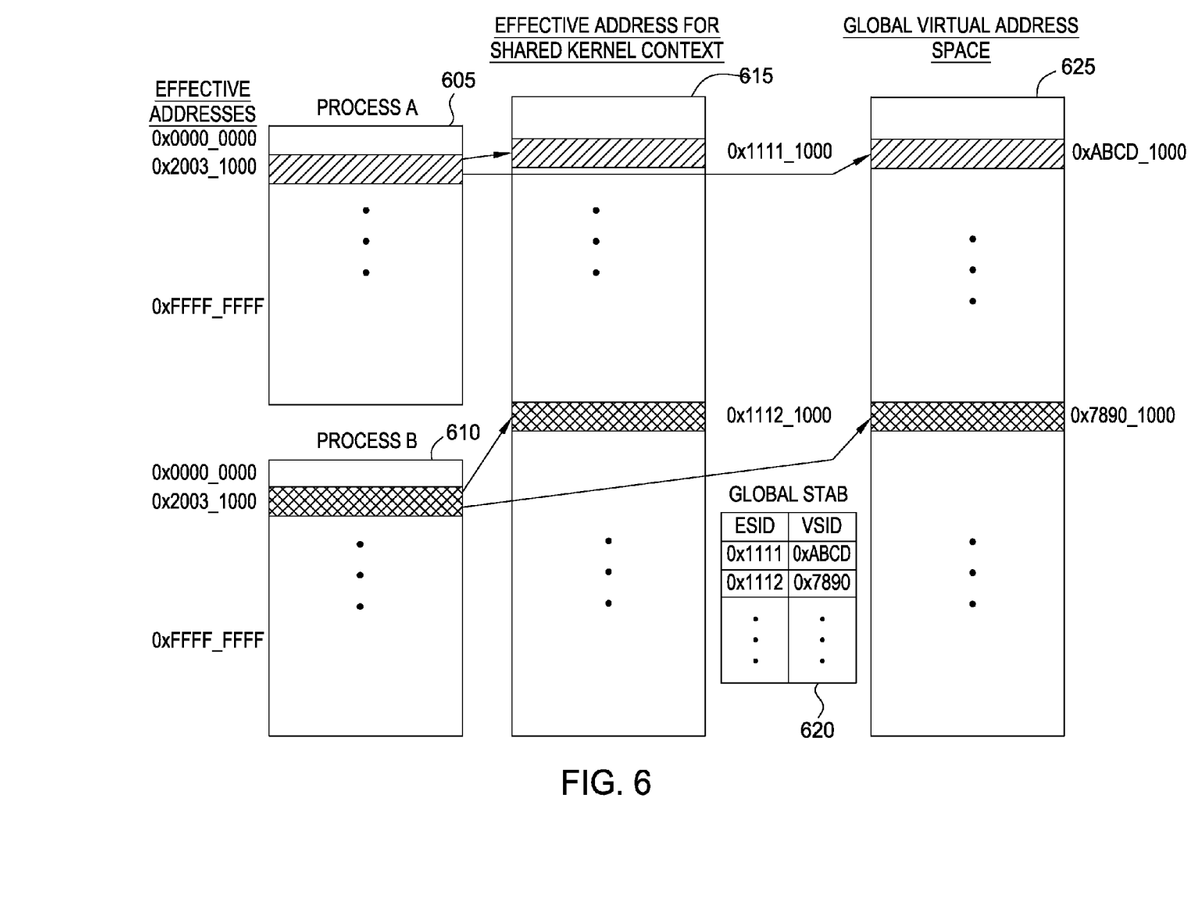
FIG. 6 illustrates an example of mapping effective addresses of processes sharing a coherent accelerator context to a virtual address, according to one embodiment.

FIG. 6 illustrates an example of mapping effective addresses of processes sharing a coherent accelerator context to a virtual address, according to one embodiment. As shown, the example includes an effective address space 605 for a process A, an effective address space 610 for a process B, an effective address space 615 for a shared kernel context, a global segment table (STAB) 620, and a global virtual address space 625. In this example, assume that processes A and B are unaware of the coherent accelerator adapter 132 (i.e., the processes do not include user space device drivers for communicating directly with the coherent accelerator adapter 132). As stated, effective addresses for individual processes do not directly map to the global virtual address space 620. One reason is that each process has a distinct effective address space. For instance, address 0x2003_1000 of process A is a different address from address 0x2003_1000 of process B.

Therefore, the kernel device driver for the coherent accelerator adapter 132 may remap the effective addresses to the effective address space 815 for the shared kernel context. As shown, the effective address 0x2003_1000 of process A maps to 0x1111_1000 in the effective address space 615. Further, the effective address 0x2003_1000 of process B maps to 0x1112_1000 in the effective address space 615. Remapping the process-specific effective addresses to the effective address space 615 allows the coherent accelerator adapter to identify mappings to virtual addresses in the global STAB 620 (using ESIDs and VSIDs).

The global STAB 620 allows the effective addresses in the address space 615 to be mapped to the global virtual address space 625. The global STAB 620 maps each effective address to virtual address using ESIDs and VSIDs. For example, as shown, ESID 0x1111 maps to VSID 0xABCD. And ESID 0x1112 maps to VSID 0x7890. Turning to the global virtual address space 625, the effective address 0x1111_1000 (corresponding to 0x2003_1000 of process A) maps to virtual address 0xABCD_1000. And the effective address 0x1112_1000 (corresponding to address 0x2003_1000 of process B) maps to virtual address 0x7890_1000.

Figure 7A:
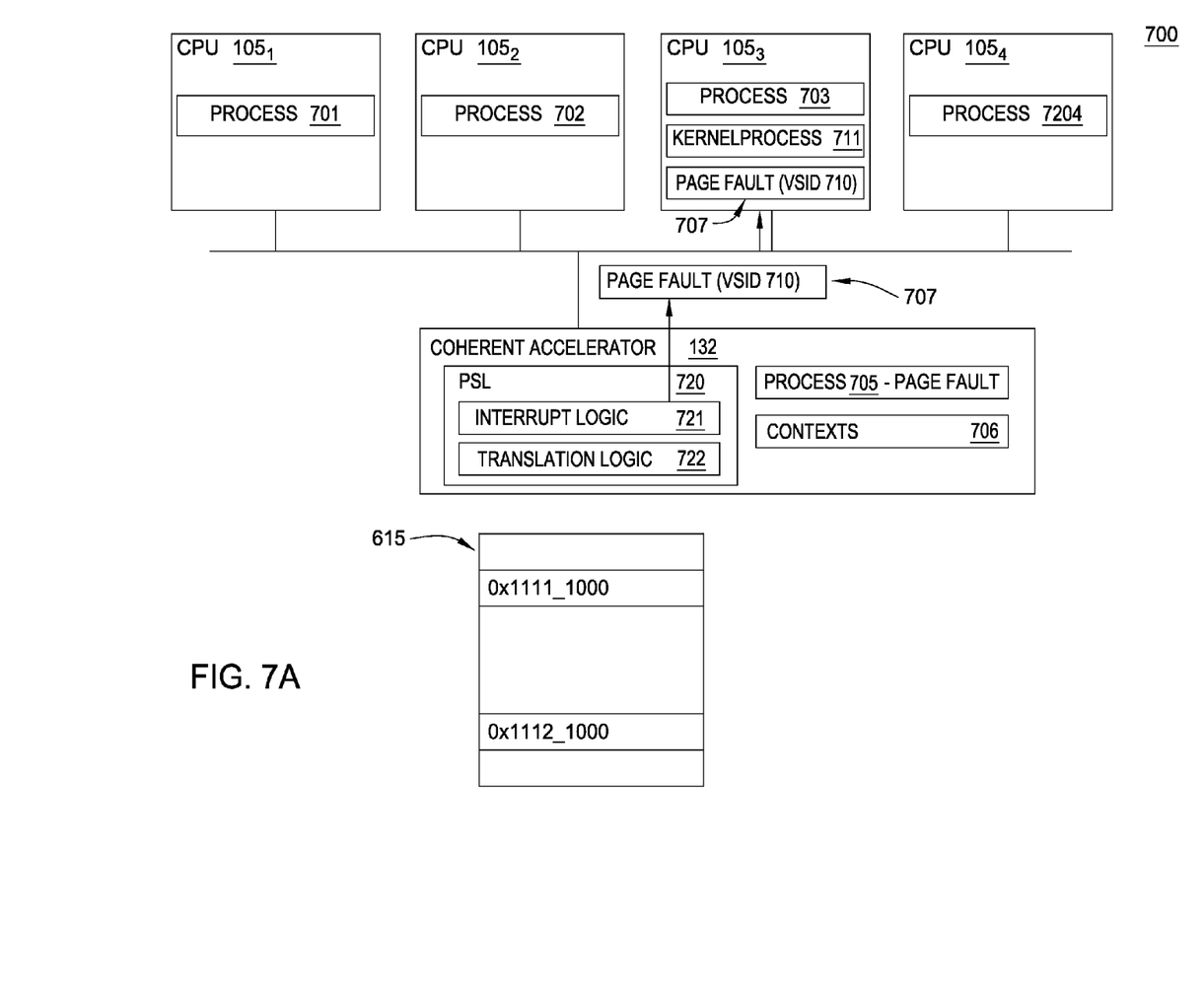
FIGS. 7A-7B illustrate techniques to resolve page faults out of context for a shared context on a system configured with a coherent accelerator, according to one embodiment.

FIG. 7A illustrates techniques to resolve page faults out of context for a shared context on a system configured with a coherent accelerator, according to one embodiment. FIG. 7A is a schematic 700 illustrating techniques to resolve page faults out of context on a system configured with a coherent accelerator, according to one embodiment. As shown, the system 100 includes four example CPUs, namely CPUs 105$_{1-4}$. Each CPU 105$_{1-4}$ is depicted as executing a process, namely processes 701-704, respectively. FIG. 7A also depicts the coherent accelerator 132 of the system 100. As shown, the coherent accelerator executes operations for a process 705, and includes a processor service layer (PSL) 720 and plurality of contexts 706. In one embodiment, the PSL 720 is a memory management unit (MMU). Therefore, the PSL 720 translates memory addresses from virtual to real addresses, and generates page faults. The PSL 720 includes the interrupt logic 721 and address translation logic 722. The interrupt logic 721 is configured to generate an interrupt responsive to errors such as page faults. The address translation logic 722 is configured to translate effective addresses to real memory addresses as described above.

The contexts 706 are hardware contexts that provide resources to an application (or the kernel). The resources include, without limitation, a private segment table that gives the context 706 access to an application's address space directly (the "coherent" property of the coherent accelerator 132), a number of interrupt sources (for page faults, errors, and the like), a command/response queue (e.g., a description of desired operations, such as encryption or decryption of a specified portion of memory), and a memory mapped I/O range. An application (or the kernel) attaching to a hardware context 706 inherits these resources. Doing so allows the application to control the coherent accelerator 132 (e.g., issue commands), and allows the coherent accelerator 132 to read and/or write data directly from the application's address space without having to go through the device driver or kernel to set up DMA. As previously indicated, one or more contexts 706 may be shared among multiple processes.

The contexts 706 may be viewed as a run-queue, where the coherent accelerator 132 executes commands associated with each context 706. Generally, the coherent accelerator 132 executes commands for a single context 706 at any given time. The coherent accelerator 132 may move through the run-queue of contexts 706 using any number of switching methods. For example, the coherent accelerator 132 may perform "round robin" among the contexts 706, where each context 706 runs for a specified amount of time (like the 10 ms context switch in UNIX). Further still, the coherent accelerator 132 may switch to a different context 706 when a current context 706 encounters a page fault, or when data for a context 706 becomes available. Regardless of the method used to switch between contexts 706, by switching between contexts, the coherent accelerator 132 provides quality of service (QoS) for all applications exploiting the coherent accelerator 132.

As shown, an instruction issued by the process 705 on the coherent accelerator 132 has triggered a page fault 707. The process 705 may be a process that uses a shared context. Because the coherent accelerator 132 is not a full processor, the coherent accelerator 132 cannot resolve the page fault. Any number and type of page faults may occur on the coherent accelerator 132. For example, and without limitation, a page table entry (PTE) missing fault may occur, where a page exists in memory, but no entry exists in the page table 111 for the requested memory location. As another example, the page may not be present in memory. As still another example, a protection fault may occur (such as attempting to write to read-only memory). Further still, the page fault may be associated with the private segment table of a process.

As shown in FIG. 7A, when the page fault 707 occurs, the interrupt logic 721 generates and sends an interrupt 707 to the processor 105$_3$. As previously discussed, however, the CPU 105$_3$ is executing process 703. Therefore, from the perspective of the CPU 105$_3$, the interrupt 707 is an out of context exception. As shown, the page fault 707 includes a VSID 710 as a state attribute (of a plurality of state attributes) associated with the page fault 707. Generally, the state information of the page fault 707 may include the faulting virtual address, the reason for the fault, the faulting instruction (e.g., the instruction in a program counter), and the segment information (e.g., the VSID 710 from the global segment table 620). The kernel process 711 executing on the CPU 105$_3$ may leverage the VSID 710 to resolve the page fault triggered by the coherent accelerator 132. To do so, the kernel process 711 must make the VSID 710 addressable, allowing the CPU 105$_3$ to recreate the page fault by attempting to touch the faulting address. As shown, however, the effective address space for the shared kernel context 615 does not include an entry for the VSID 710. The effective address space 615 for the shared kernel context is the shared address space for the kernel process 711.

Figure 7B:
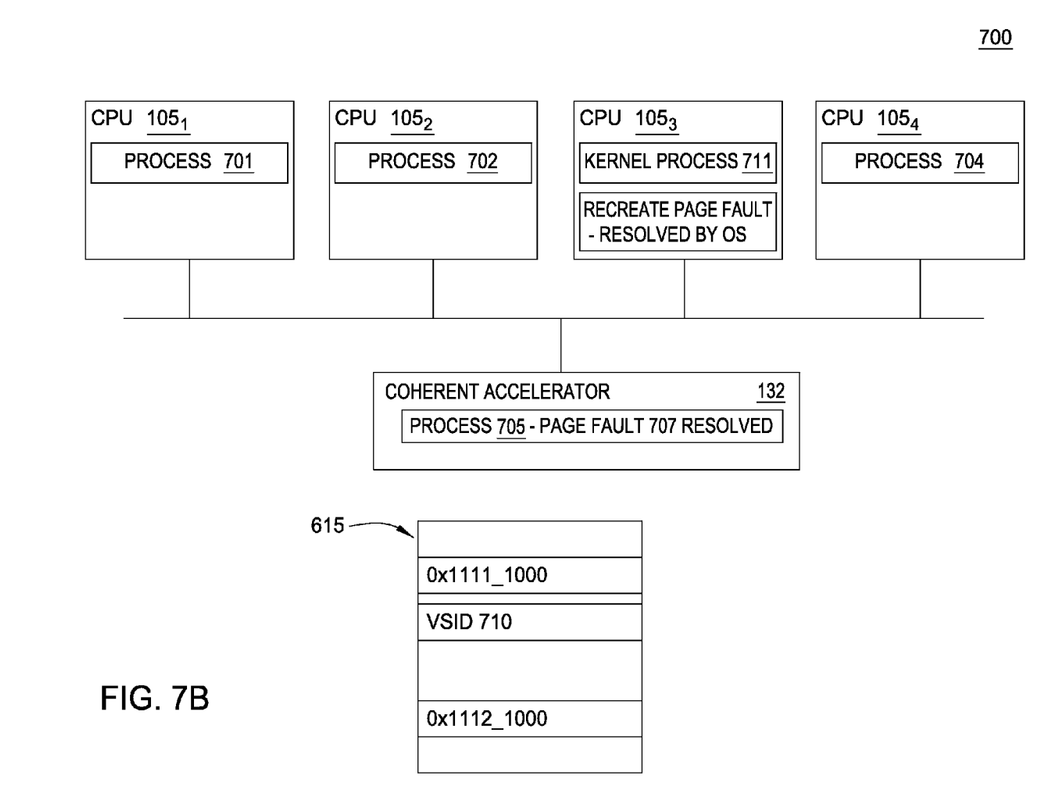

FIG. 7B depicts the example embodiment where the kernel process 711 has created an entry for the VSID 710 in the effective address space 615 for the shared kernel context. Doing so recreates the state of the shared context 706 on the CPU $105_3$, which allows the page fault to be recreated on the CPU $105_3$ for handling by the operating system page fault handler 150. In one embodiment, the entry for the VSID 710 in the effective address space 615 for the shared kernel context comprises a temporary effective address similar to the effective addresses in tables 605, 610. To create the temporary effective address, the kernel process 711 may use a temporary attachment operation (such as the vm_att operation in the AIX operating system), which maps a specified virtual memory object (which may be associated with the VSID 710) to a region in the current address space being executed by the CPU $105_3$. In one embodiment, the current address space may be the effective address space 615 for the shared kernel context (the kernel process 711). In another embodiment, the current address space may be the effective address space for the process executing on the processor (e.g., process 203 of FIG. 7A). In creating the temporary effective address for the VSID 710, the kernel process 711 may provide the offset in the VSID 710 to the attachment operation.

Once the temporary effective address for the VSID 710 is created in the effective address space 615, the CPU $105_3$ can "touch" the faulting address. For example, the kernel process 711 may set a pointer to the faulting address (e.g., the temporary effective address). When the pointer is set by the CPU $105_3$, touching the faulting address, the page fault 707 is recreated on the CPU $105_3$. Once the page fault 707 is recreated on the CPU $105_3$, the page fault handler 150 of the operating system may be invoked, and the page fault may be successfully resolved. Resolving the page fault may include creating the appropriate entry in the page table 111, or bringing the page into memory 120. When the page fault is resolved, the CPU $105_3$ may restart the coherent accelerator 132 as described above.

Figure 8:
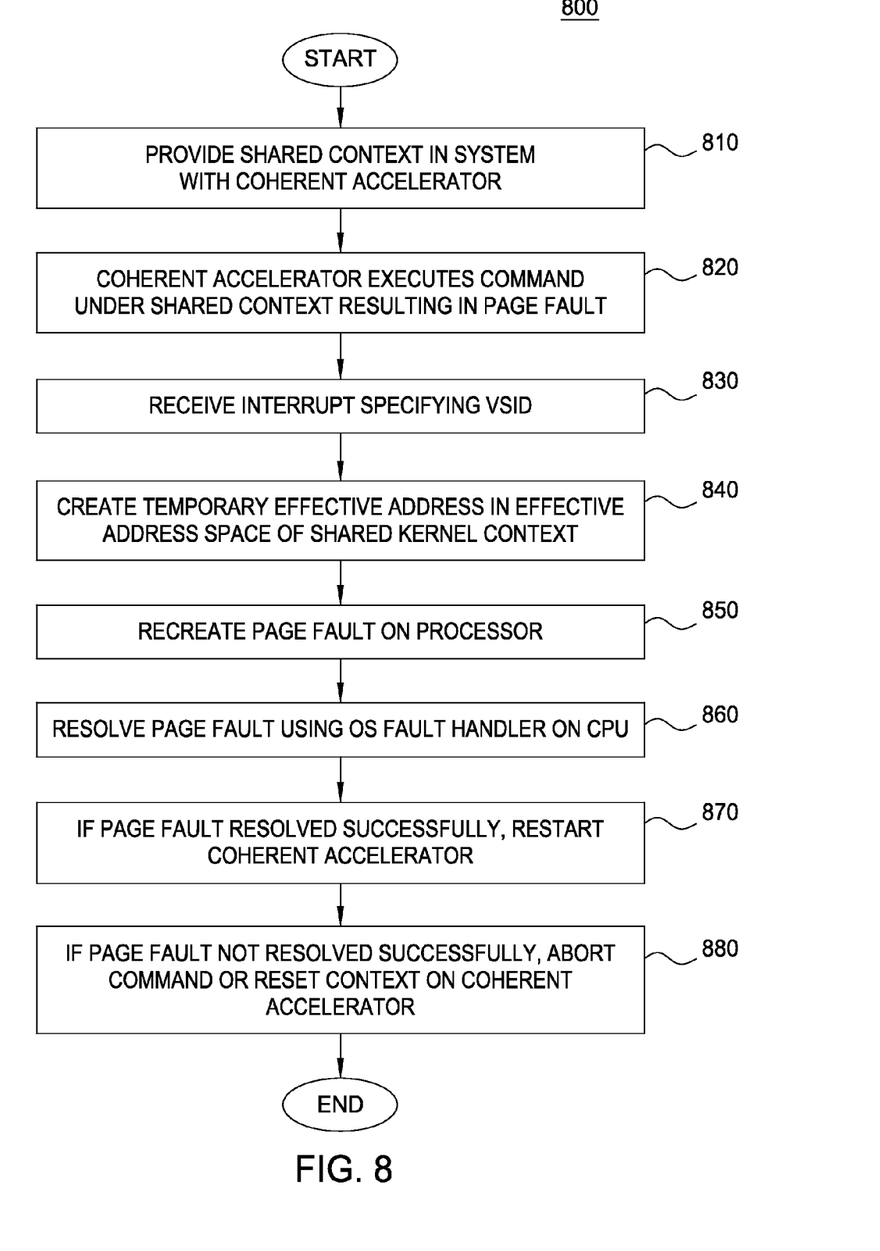
FIG. 8 illustrates a method to resolve page faults out of context for a shared context on a system configured with a coherent accelerator, according to one embodiment.

FIG. 8 illustrates a method 800 to resolve page faults out of context for a shared context on a system configured with a coherent accelerator, according to one embodiment. As shown, the method 800 begins at step 810, where a shared context is provided in a system with a coherent accelerator. The shared (or multiplexed) context may be used by a number of different processes executing on the system. Doing so conserves hardware contexts, which are a limited resource on the coherent accelerator 132. In addition, providing shared contexts in the kernel device driver allows applications that are not configured to communicate with the coherent accelerator 132 to use the coherent accelerator 132. At step 820, the coherent accelerator 132 executes a command under a shared context that results in a page fault. At step 830, a processor may receive an interrupt from the interrupt logic 721 of the coherent accelerator 132. The interrupt may specify the VSID of the faulting address, where the VSID is from the global STAB 625 (i.e., the global virtual address space of the system). In at least one embodiment, the kernel process owning the shared context receives the interrupt, and the page fault exception is queued to the kernel process. At step 840, the kernel process may create a temporary effective address for the VSID in the effective address space 615 for the shared kernel context. At step 850, the kernel process (and/or the process currently executing on the CPU) may attempt to access the temporary effective address, recreating the page fault on the processor.

At step 860, the CPU may invoke the page fault handler 150 of the operating system 140 to resolve the page fault that has been recreated on the CPU. At step 870, if the page fault handler 150 resolves the page fault successfully, the coherent accelerator 132 is restarted using the techniques described above. Doing so allows the coherent accelerator 132 to re-issue the command which caused the page fault at step 810 without incurring the page fault again. At step 880, if the page fault handler 150 does not resolve the page fault successfully, the command which caused the page fault on the coherent accelerator 132 is aborted, or the context of the coherent accelerator 132 is reset (allowing a new context 706 to begin executing).

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

In the foregoing, reference is made to embodiments presented in this disclosure. However, the scope of the present disclosure is not limited to specific described embodiments. Instead, any combination of the recited features and elements, whether related to different embodiments or not, is contemplated to implement and practice contemplated embodiments. Furthermore, although embodiments disclosed herein may achieve advantages over other possible solutions or over the prior art, whether or not a particular advantage is achieved by a given embodiment is not limiting of the scope of the present disclosure. Thus, the recited aspects, features, embodiments and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

Aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system."

The present disclosure may be a system, a method, and/or a computer program product. The computer program product may include a computer readable storage medium (or media) having computer readable program instructions thereon for causing a processor to carry out aspects of the present disclosure.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the foregoing is directed to embodiments of the present disclosure, other and further embodiments of the disclosure may be devised without departing from the basic scope thereof, and the scope thereof is determined by the claims that follow.

What is claimed is:

1. A method comprising:
creating, by an operating system (OS) kernel, a temporary effective address associated with a virtual segment identifier (VSID), wherein the VSID is received by a processor in an asynchronous interrupt generated by a coherent accelerator in response to a page fault generated by the coherent accelerator in executing an instruction;
creating a hidden thread handler in the OS kernel;
accessing, by the hidden thread handler executing on the processor, the temporary effective address to recreate the page fault on the processor; and
resolving the page fault by the OS executing on the processor.

2. The method of claim 1, wherein the page fault is generated by the coherent accelerator while executing an instruction of a first process, wherein the first process is associated with a first hardware context of the coherent accelerator shared by a plurality of processes including the first process.

3. The method of claim 2, wherein the VSID is specified in a segment table shared by the plurality of processes sharing the first hardware context, wherein each of the plurality of processes maintains a distinct effective address space.

4. The method of claim 1, further comprising:
determining a byte offset from the temporary effective address; and
determining a real address of a memory location subject to the page fault using the VSID and the byte offset.

5. The method of claim 1, wherein creating the temporary effective address includes associating the VSID with a temporary process and makes the VSID addressable by the kernel.

6. The method of claim 1, wherein the page fault was generated by a first process, wherein the OS kernel, when creating the temporary address, is executing a second process, wherein the first and second processes are unrelated, wherein recreating the page fault on the processor converts the asynchronous interrupt to a synchronous exception.

7. The method of claim 1, wherein the processor is of a plurality of processors in a system, the method further comprising:
upon determining the page fault was resolved by the operating system, restarting the coherent accelerator.

8. A system, comprising:
a processor;
a coherent accelerator; and
a memory storing program code, which, when executed on the processor, performs an operation comprising:
creating, by an operating system (OS) kernel, a temporary effective address associated with a virtual segment identifier (VSID), wherein the VSID is received by a processor in an asynchronous interrupt generated by a coherent accelerator in response to a page fault generated by the coherent accelerator in executing an instruction;
creating a hidden thread handler in the OS kernel;
accessing, by the hidden thread handler executing on the processor, the temporary effective address to recreate the page fault on the processor; and
resolving the page fault by the OS executing on the processor.

9. The system of claim 8, wherein the page fault is generated by the coherent accelerator while executing an instruction of a first process, wherein the first process is associated with a first hardware context of the coherent accelerator shared by a plurality of processes including the first process.

10. The system of claim 9, wherein the VSID is specified in a segment table shared by the plurality of processes sharing the first hardware context, wherein each of the plurality of processes maintains a distinct effective address space.

11. The system of claim 8, further comprising:
determining a byte offset from the temporary effective address; and
determining a real address of a memory location subject to the page fault using the VSID and the byte offset.

12. The system of claim 8, wherein the page fault was generated by a first process, wherein the OS kernel, when creating the temporary address, is executing a second process, wherein the first and second processes are unrelated wherein recreating the page fault on the processor converts the asynchronous interrupt to a synchronous exception.

13. The system of claim 8, wherein the processor is of a plurality of processors in a system, the operation further comprising:
upon determining the page fault was resolved by the operating system, restarting the coherent accelerator.

14. A computer program product comprising:
a non-transitory computer-readable storage medium having computer-readable program code embodied therewith, the computer-readable program code executable by one or more computer processors to perform an operation comprising:
creating, by an operating system (OS) kernel, a temporary effective address associated with a virtual segment identifier (VSID), wherein the VSID is received by a processor in an asynchronous interrupt generated by a coherent accelerator in response to a page fault generated by the coherent accelerator in executing an instruction;
creating a hidden thread handler in the OS kernel;
accessing, by the hidden thread handler executing on the processor, the temporary effective address to recreate the page fault on the processor; and
resolving the page fault by the OS executing on the processor.

15. The computer program product of claim 14, wherein the page fault is generated by the coherent accelerator while executing an instruction of a first process, wherein the first process is associated with a first hardware context of the coherent accelerator shared by a plurality of processes including the first process.

16. The computer program product of claim 15, wherein the VSID is specified in a segment table shared by the plurality of processes sharing the first hardware context, wherein each of the plurality of processes maintains a distinct effective address space.

17. The computer program product of claim 14, further comprising:
determining a byte offset from the temporary effective address; and
determining a real address of a memory location subject to the page fault using the VSID and the byte offset.

18. The computer program product of claim 14, wherein the page fault was generated by a first process, wherein the OS kernel, when creating the temporary address, is executing a second process, wherein the first and second processes are unrelated, wherein recreating the page fault on the processor converts the asynchronous interrupt to a synchronous exception.

19. The computer program product of claim 14, wherein the processor is of a plurality of processors in the system, the operation further comprising:
upon determining the page fault was resolved by the operating system, restarting the coherent accelerator.

* * * * *